US008937686B2

(12) United States Patent
Backer (10) Patent No.: US 8,937,686 B2
(45) Date of Patent: Jan. 20, 2015

(54) ULTRA LOW LATENCY VIDEO FUSION (71) Applicant: DRS RSTA, Inc., Melbourne, FL (US)

(72) Inventor: Brian Backer, Allen, TX (US)

(73) Assignee: DRS RSTA, Inc., Melbourne, FL (US)

( * ) Notice: Subject to any disclaimer, the term of this patent is extended or adjusted under 35 U.S.C. 154(b) by 0 days.

(21) Appl. No.: 14/205,222

(22) Filed: Mar. 11, 2014

(65) Prior Publication Data
US 2014/0267917 A1 Sep. 18, 2014

Related U.S. Application Data (60) Provisional application No. 61/782,871, filed on Mar. 14, 2013.

(51) Int. Cl.
H04N 5/57 (2006.01)
H04N 5/265 (2006.01)

(52) U.S. Cl.
CPC ..................................... H04N 5/265 (2013.01)
USPC .......................................................... 348/598

(58) Field of Classification Search
USPC .................. 348/598, 599, 584–586, 588–589
See application file for complete search history.

(56) References Cited

U.S. PATENT DOCUMENTS

| 5,115,314 | A | * | 5/1992 | Ross et al. | 348/596 |
| 7,970,194 | B2 | * | 6/2011 | Kimura | 382/131 |
| 8,514,263 | B2 | * | 8/2013 | Periyannan et al. | 348/14.08 |
| 2008/0069417 | A1 | * | 3/2008 | Kimura | 382/131 |
| 2009/0285271 | A1 | * | 11/2009 | Perez De Aranda Alonso et al. | 375/219 |
| 2012/0147973 | A1 | * | 6/2012 | Wu et al. | 375/240.25 |
| 2013/0100352 | A1 | * | 4/2013 | McGowan et al. | 348/659 |

* cited by examiner

Primary Examiner — Paulos M Natnael
(74) Attorney, Agent, or Firm — Kilpatrick, Townsend & Stockton, LLP.

(57) ABSTRACT

Methods and systems for processing video are provided. A method includes receiving first and second video signals and generating a mask as a function of the second video signal, the mask having mask and peripheral areas. The method displays the first video signal in the peripheral area and processes the second video signal in the mask area. The method displays the processed second video signal in the mask area. A system includes a processor and a memory with stored instructions, that, when executed by the processor, cause the processor to receive first and second video signals and generate a mask as a function of the second video signal, wherein the mask has a mask area and a peripheral area. The system displays the first video signal in the peripheral area, processes the second video signal in the mask area, and displays the processed second video signal in the mask area.

20 Claims, 11 Drawing Sheets

FIG. 1

101 → Video from first video source (i.e., head worn or helmet video)

FIG. 1A

102 — Video from second video source (i.e., handheld source)

110 — Video image resulting from real time analysis (RTA), pixels around second video set to > 0 and pixels outside second video set to 0

ULTRA LOW LATENCY VIDEO FUSION

CROSS-REFERENCES TO RELATED APPLICATIONS

This application claims priority to U.S. Provisional Patent Application No. 61/782,871, filed Mar. 14, 2013, entitled "Ultra Low Latency Video Fusion," the disclosure of which is hereby incorporated by reference in its entirety for all purposes.

BACKGROUND OF THE INVENTION

Video processing is a form of signal processing where the input and output signals are video streams or video files comprising video images. When multiple video sources are present, video processing can include using video fusion algorithms to produce fused video imagery. Processing of video imagery through fusion algorithms can add latency between display of video from one video source and eventual display of fused video imagery including video from another source. This latency can increase viewer fatigue and result in dizziness after short periods of active usage.

Therefore, there is a need in the art for improved methods and systems to reduce or minimize latency to minimize these adverse effects.

SUMMARY OF THE INVENTION

Embodiments of the present invention relate generally to video systems. More specifically, embodiments of the present invention relate to a method and system for displaying a composite video signal having an ultra low latency region. Merely by way of example, the present invention has been applied to a method and system for low latency video fusion where a first video source is a head worn (i.e., helmet mounted) camera, and a second source is a weapon mounted video camera. Additional embodiments utilize other video sources, such as, for example, handheld video cameras, video cameras detachably mounted onto sporting equipment or other devices, and other video cameras. Accordingly, embodiments of the present invention are applicable to all commonly used video sources in a variety of video processing systems.

According to an embodiment of the present invention, a method of processing video is provided. The method includes receiving a first video signal and receiving a second video signal. The method generates a mask as a function of the second video signal. The mask has a mask area and a peripheral area. The method further includes displaying the first video signal in the peripheral area and processing the second video signal in the mask area. The method displays the processed second video signal in the mask area.

According to another embodiment of the present invention, a video processing system is provided. The video processing system includes a display device, a processor, and a memory. The memory has instructions stored thereon, that when executed by the processor, cause to processor to perform operations. The operations comprise receiving a first video signal and receiving a second video signal. The operations further comprise generating a mask as a function of the second video signal, the mask having a mask area and a peripheral area. The operations also comprise displaying, on the display device, the first video signal in the peripheral area. The operations further include processing the second video signal in the mask area, and then displaying, on the display device, the processed second video signal in the mask area.

According to yet another embodiment of the present invention, a non-transitory computer readable storage medium is provided. The computer readable storage medium has instructions stored thereon, that, if executed by a computing device, cause the computing device to perform operations. The operations include receiving a first video signal and receiving a second video signal. The operations also include generating a mask as a function of the second video signal, wherein the mask has a mask area and a peripheral area. The operations further include displaying the first video signal in the peripheral area, processing the second video signal in the mask area, and displaying the processed second video signal in the mask area.

Numerous benefits are achieved by way of the present invention over conventional techniques. For example, embodiments of the present invention minimize or reduce latency in video systems having multiple video sources, such as multiple video cameras. Embodiments improve video processing performance and the perceived video image quality by reducing latency of video from a first video source relative to a fused video including video from the first source and video imagery from another source. These and other embodiments of the invention along with many of its advantages and features are described in more detail in conjunction with the text below and attached figures.

DETAILED DESCRIPTION OF SPECIFIC EMBODIMENTS

Embodiments of the present invention provide methods and systems for processing video signals. In embodiments, helmet mounted (i.e., head worn) video fusion algorithms utilize high fidelity image processing and low cost internal measurement units to enable a handheld 'virtual' aim point to be displayed in the head mounted display. This process reduces the user's time to accurately aim the handheld device at a target. This process is also undetectable since the no active illumination devices such as lasers are necessary to ensure aiming accuracy.

Embodiments of the present invention process video imagery received from multiple video sources (i.e., a head worn source and another source) without using conventional fusion algorithms that can add undesirable latency between the head worn video and eventual display of the fused imagery. By employing real time analysis and signal processing, embodiments reduce or minimize latency between display of video from a first source and eventual display of fused video imagery including video from a second source. In this way, embodiments avoid adverse effects associated with higher latency, such as, for example, viewer fatigue and dizziness.

Embodiments of the present invention address these issues by segregating head worn Field of View (FOV) areas from handheld FOV areas. An image mask is made in which video pixels associated with the handheld device (e.g., only handheld video pixels) have value greater than zero. The mask is then applied to the video from the helmet mounted source (i.e., the original helmet video) such that fusion zero areas have imagery that has no latency.

According to an embodiment of the present invention, a method of processing video is provided. The method includes receiving a first video signal (e.g., a video signal from a helmet mounted video camera) and receiving a second video signal (e.g., a video signal from a handheld video camera, such as a video camera that is mounted on a weapon, rifle, gun, or the like). In some embodiments, the size of the video signals differs. As an example, the first video signal could be 320×240 pixels in size, which is suitable for helmet mounted or head worn video cameras. Also, for example, a second video signal could be 640×480 pixels in size, which is suitable for handheld or rifle mounted video cameras. Alternatively, the first or second video signals could have a greater or smaller number of pixels as appropriate to the particular applications.

The method also includes generating a mask as a function of the second video, The mask has a mask area and a peripheral area. In an embodiment, the video signal inside the mask area is used for signal processing and the video signal outside the mask area can be assigned a pixel value of zero.

The method further includes displaying the first video signal in the peripheral area. Because the first video signal in the peripheral area undergoes minimal to no signal processing, such as real time analysis (RTA) processing, the latency associated with the video display in the peripheral area is negligible, also referred to as ultra low latency. As an example, the latency can be in a range from about zero milliseconds (ms) to about three ms.

The method includes processing the second video signal in the mask area, for example, using RTA signal processing, and displaying the processed second video signal in the mask area. The signal processing can include performing real time analysis of the first video signal in the mask area and the second video signal in the mask area. Thus, the video display supports a composite video in which the peripheral portion has ultra low latency and the mask area includes some latency.

Figure 1:
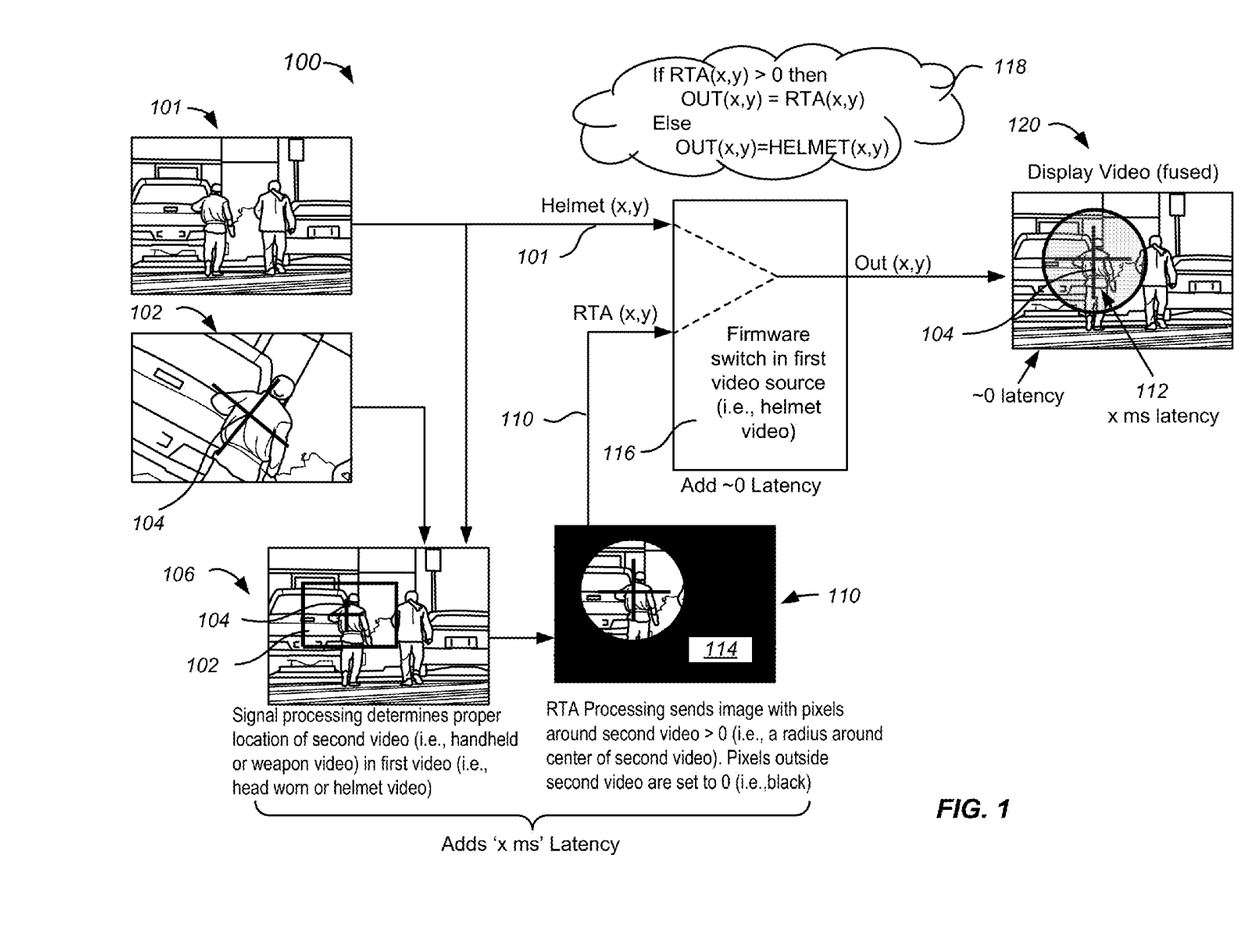
FIG. 1 illustrates a workflow for low latency video fusion according to an embodiment of the present invention.
Figure 1A:
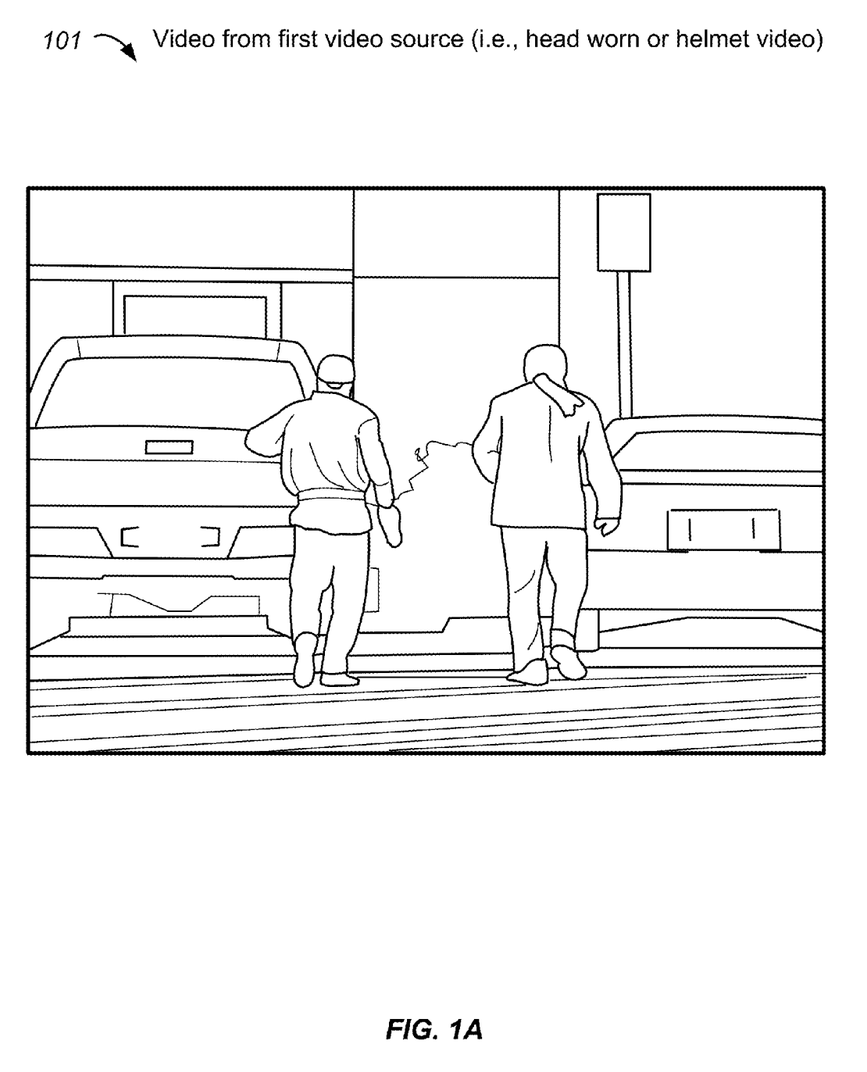
FIGS. 1A-1F depict inputs, steps, components, and outputs of the workflow of FIG. 1 according to embodiments of the present invention.

FIG. 1 illustrates a workflow 100 for low latency video fusion according to an embodiment of the present invention. As illustrated in FIG. 1, workflow 100 begins when a first video 101 is received from a first video source. In embodiments, the first source can be a helmet-mounted or a head worn video camera. For example, the first video source can be a head mounted night-vision goggle, with first video 101 being a video signal output by the goggle. FIG. 1A provides an enlarged view of first video 101.

Figure 1B:
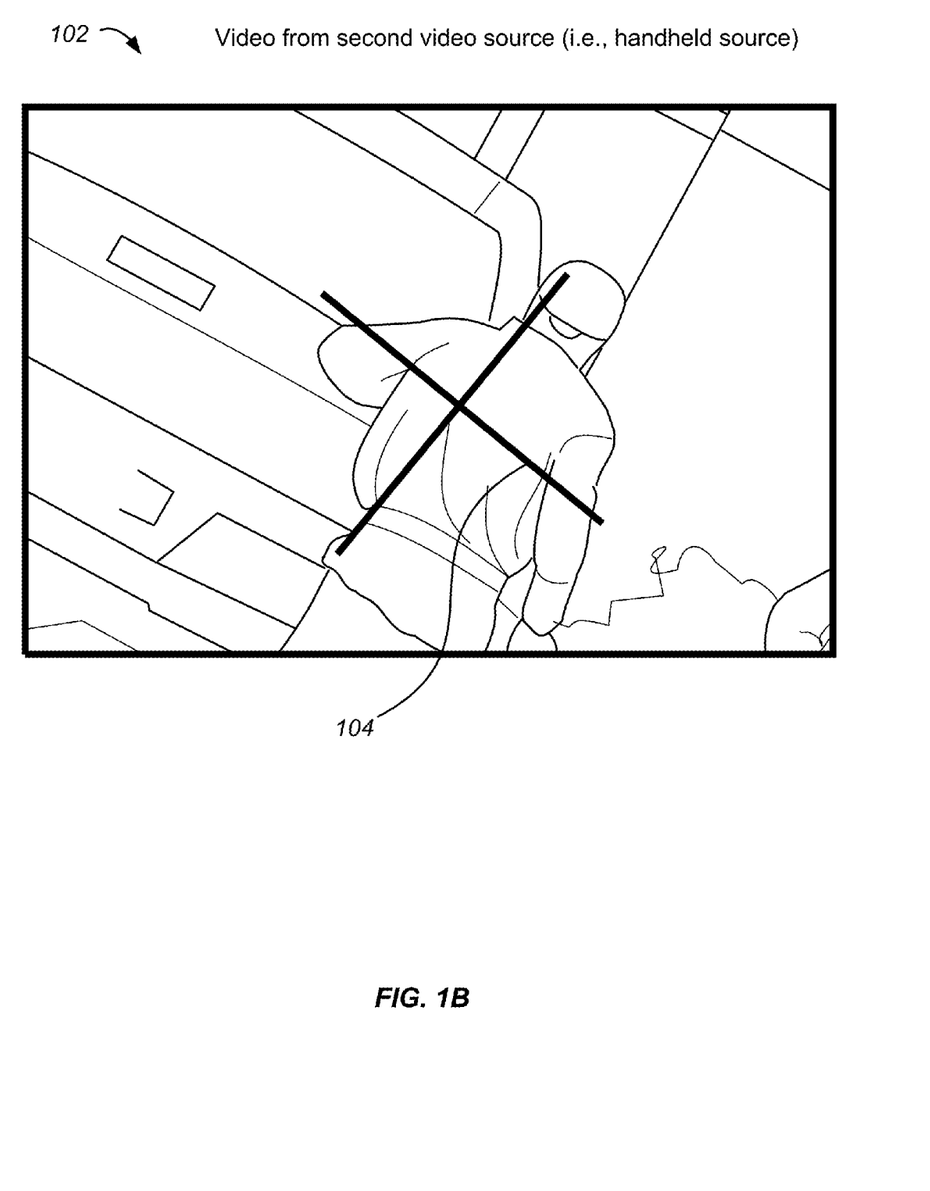

Next, a second video 102 is received from a second video source. According to embodiments, the second video source can be, for example, a handheld or weapon-mounted video source. For instance, the second video source can be a weapon mounted video source incorporated into a weapon sight with second video 102 being a video signal output by the sight. As shown, second video 102 has a center 104. FIG. 1B provides an enlarged view of second video 102 and its center 104. In embodiments where the first video source is a helmet mounted video source, the second video source can be a video camera worn on a portion of the wearer of the helmet. For example, according to these embodiments, the second video source can be a video camera worn on the wrist, forearm, hand, or other portion of the wearer of the helmet.

In the exemplary embodiment of FIG. 1, the size of the first and second videos 101 and 102 differ. In particular, second video 102 has a smaller field of view than first video 101, with second video being a subset of first video 101. In an embodiment, first and second videos 101 and 102 have different resolution, with second video representing a smaller area than first video 101. As an example, the first video 101 can be a signal 320×240 pixels in size, such as a signal output by a helmet mounted or head worn video camera. Also, for example, second video 102 can be a signal 640×480 pixels in size, such as a signal output by a handheld or weapon-mounted video camera. Alternatively, the first or second videos 101 or 102 could have a greater or smaller number of pixels as appropriate for their respective sources.

Figure 1C:
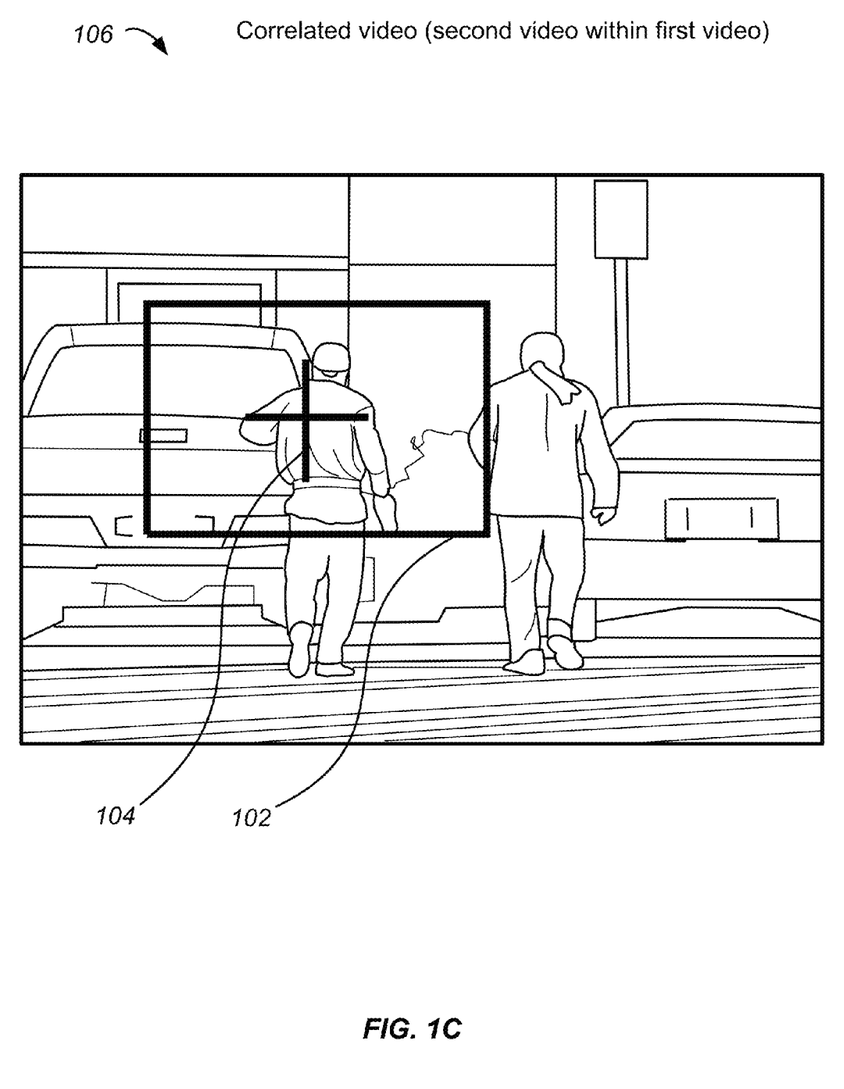

At this point, workflow 100 performs signal processing to determine the proper location of second video 102 in first video 101. In the example provided in FIG. 1, first video 101 is from a head worn or helmet video source and second video 102 is from handheld or weapon-mounted source. As shown, the signal processing performed as part of workflow 100 creates a correlated video 106 by determining the location of second video 102 within first video 101. In an embodiment, the signal processing to create correlated video 106 can be performed by an RTA processor housed in a battery pack. The battery pack can be, for example, a head worn or helmet-mounted battery pack used as a power supply for the first video source (see, e.g., power supply 260 in FIG. 2). An enlarged view of correlated video 106 is provided in FIG. 1C.

Next, workflow 100 creates a mask based on the correlation and produces a video image 110 using the mask. In the example of FIG. 1, video image 110 is produced by real time analysis (RTA) processing. Workflow 100 processes correlated video 106 in the mask area, for example, using RTA signal processing, to create video image 110, which includes the processed correlated video 106 in the mask area. The RTA signal processing can include performing real time analysis of the first video 101 in the mask area and the second video 102 in the mask area. In this way, the display video 120 generated by workflow 100 is a composite video in which the peripheral portion has ultra low latency and the mask area includes some negligible latency.

Figure 1D:
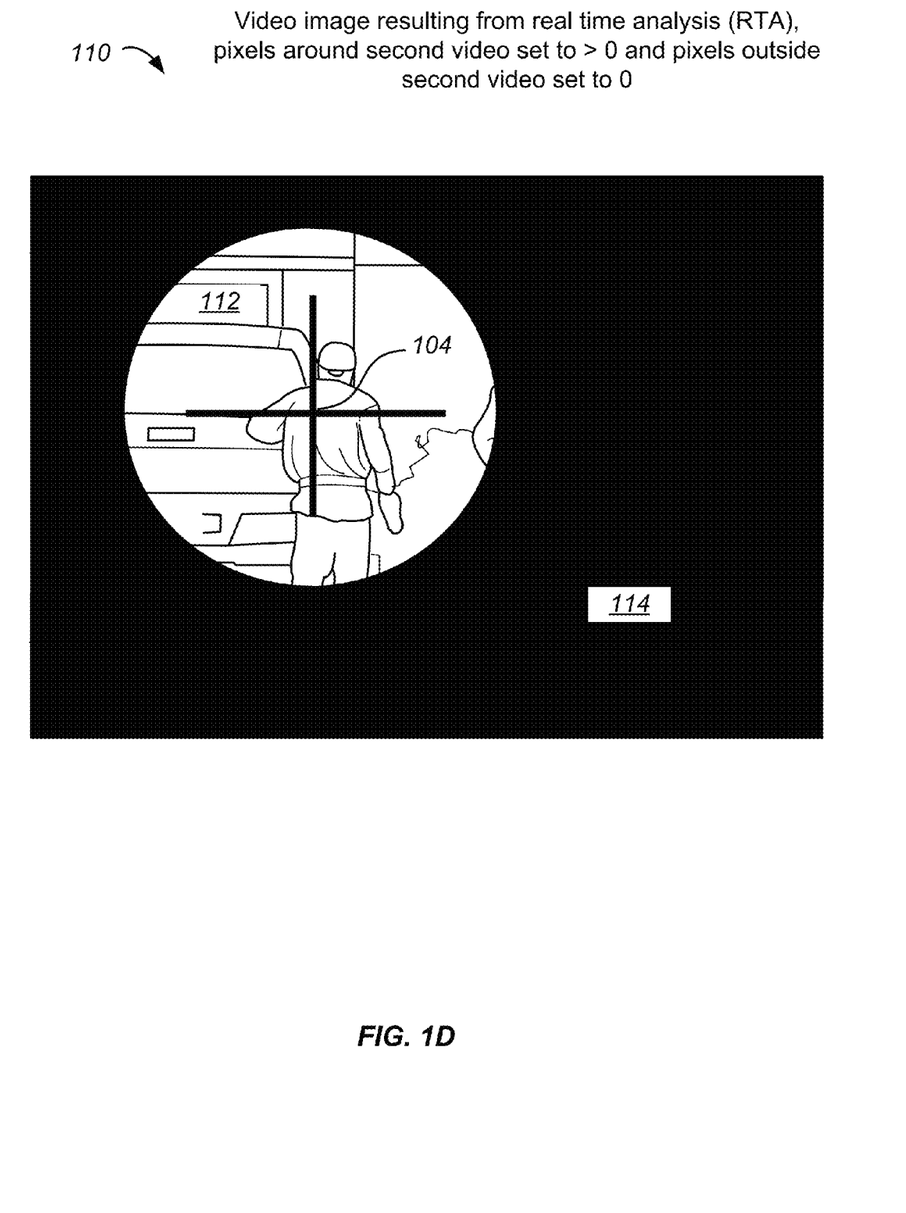

In the example embodiment provided in FIG. 1, the RTA processing uses the mask to create video image 110 with pixels from second video 102 set to >0 and pixels outside the second video 102 set to 0. As shown, video image 110 includes pixels from correlated video 106 in an area 112 around center 104 of second video 102. Pixels outside area 112 are set to zero (shown as the black portion 114 of video image 110). In the non-limiting embodiment of FIG. 1, area 112 is defined by a circle with center 104 of second video 102 and a radius with a certain length. For example, area 112 can be defined by a radius from center 104. According to embodiments, the radius is a tunable value expressed in terms of pixels, micrometers (µm), millimeters (mm), or another suitable measurement. In an embodiment, the RTA processing performed to produce video image 110 can be performed by an RTA processor housed in a battery pack used as a power supply for the first video source. FIG. 1D provides an enlarged view of video image 110 and area 112 around center 104.

RTA processing then sends video image 110 to a firmware switch 116. As illustrated in FIG. 1, first video 101 is also provided to firmware switch 116, which executes instructions 118 for producing an output display video 120. As seen in FIG. 1, the signal processing to produce correlated video 106 and RTA processing performed to produce video image 110 can result in some negligible latency relative to first video 101. In the example of FIG. 1, firmware switch 116 can be part of a first video source. For example, the latency can be in a range from about 0 ms to about 3 ms. Firmware switch 116 can act as a multiplexer by executing instructions 118 to evaluate pixels in video image 110 in order to generate display video 120. As shown in FIG. 1, instructions 118 determine if a given pixel at location x,y in video image 110 is greater than zero (e.g., if RTA(x,y)>0). If instructions 118 determine that the given pixel has a value greater than zero, then the pixel at location x,y in display video 120 is set to the value of the corresponding pixel in correlated video 106. Otherwise, the pixel at location x,y in display video 120 is set to the value of the corresponding pixel in first video 101. In the example embodiment shown in FIG. 1, instructions 118 include the following instructions:

If RTA(x,y)>0 then
    OUT(x,y)=RTA(x,y)
Else
    OUT(x,y)=HELMET(x,y)

In additional or alternative embodiments, instructions 118 can include the following instructions:

If RTA(x,y)>CONSTANT then
    OUT(x,y)=RTA(x,y)
Else
    OUT(x,y)=HELMET(x,y)

Where CONSTANT is a predetermined, tunable value. For example, in cases where CONSTANT is set to zero, instructions 118 will be the instructions shown in FIG. 1.

Figure 1E:
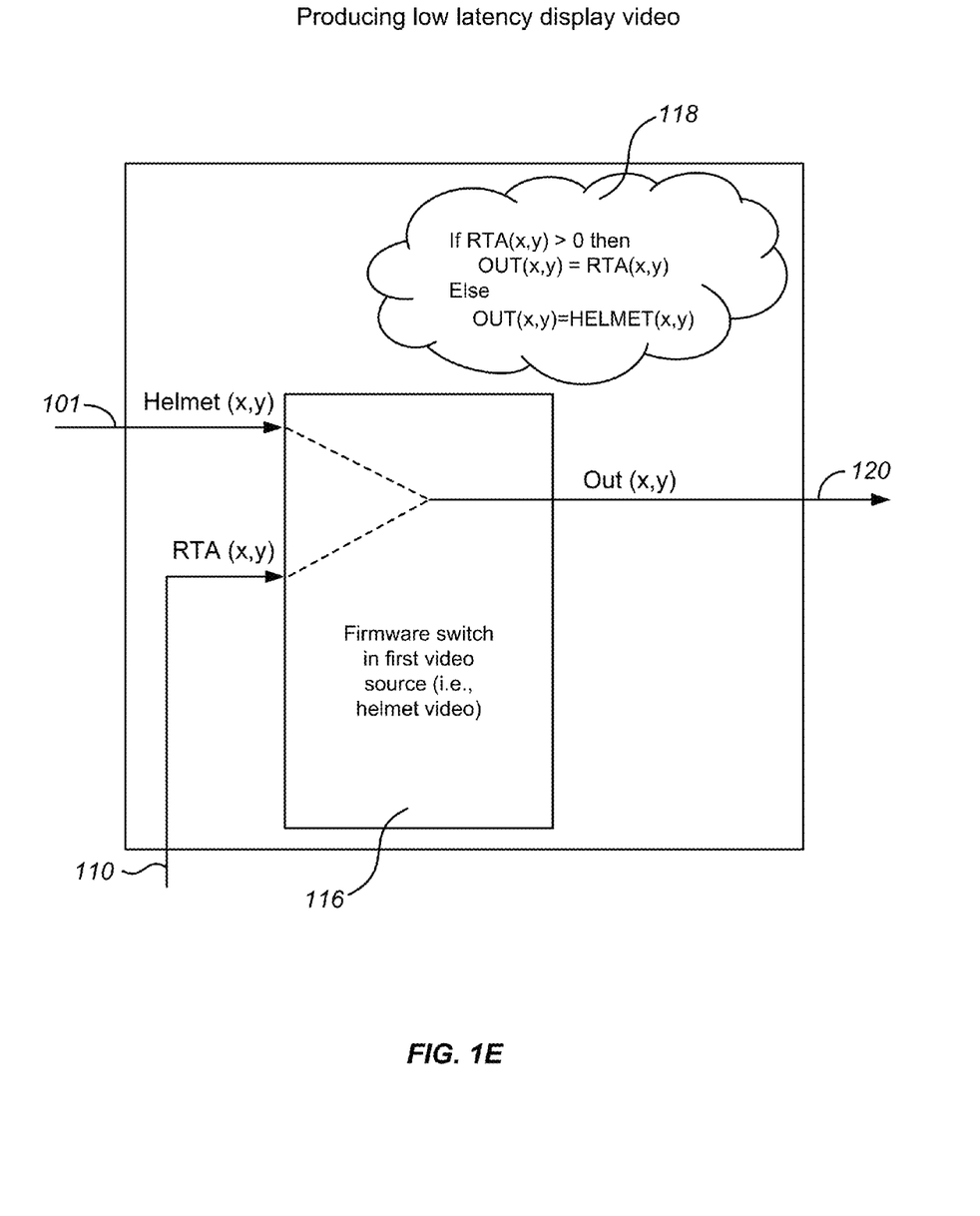

FIG. 1E provides an enlarged view of firmware switch 116 and instructions 118.

Figure 1F:
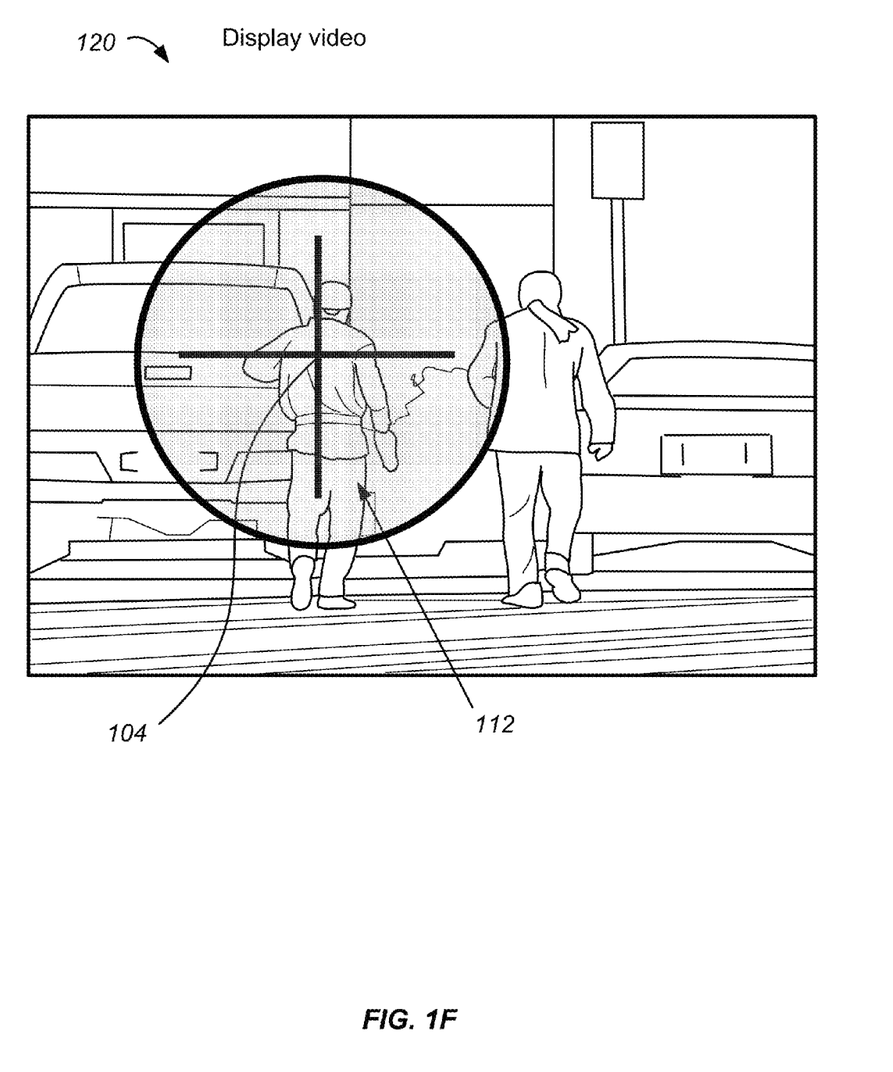

Display video 120 is the resulting, fused video produced by executing instructions 118 for each pixel in video image 110. The resulting display video 120 can have slightly varying latencies for different areas of the video image. For example, as shown in FIG. 1, area 112 can have minimal latency resulting from the signal and RTA processing carried out to produce correlated video 106 and video image 110, while the remaining area of display video 120 will have substantially zero latency. This is because the remaining area outside of area 112 includes pixels primarily from video 101. Pixels taken directly from video 101 will have nearly no added latency, while pixels in area 112 can have, for example from about 0 ms to about 3 ms of latency. In an embodiment, portions of video 101 included in display video 120 will have no additional latency due to signal processing or RTA processing. An enlarged view of display video 120 and area 112 is provided in FIG. 1F.

Figure 2:
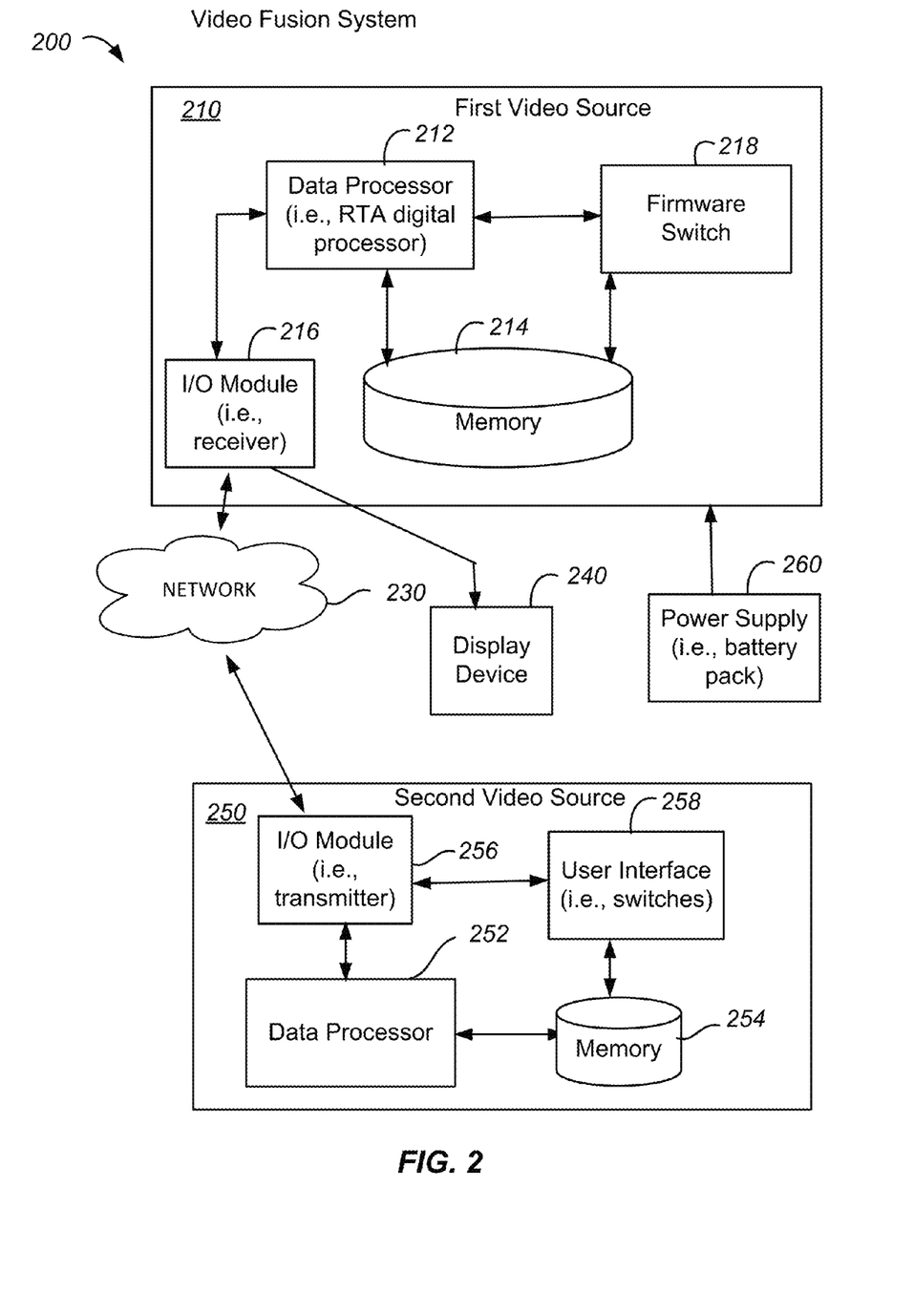
FIG. 2 is a high level schematic diagram illustrating a video fusion system according to an embodiment of the present invention.

FIG. 2 is a high level schematic diagram illustrating a video fusion system 200 according to an embodiment of the present invention. As illustrated in FIG. 2, video fusion system 200 includes a first video source 210 and a second video source 250. As shown, second video source 250 interacts with the first video source 210 through network 230. In an embodiment, network 230 can be a wireless network. For example, first video source 210 and second video source 250 can communicate via a wireless ultra-wide band (UWB) connection. As will be appreciated by one of ordinary skill in the art, UWB connections may be used at a very low energy level for short-range, high-bandwidth communications using a large portion of the radio spectrum.

Figure 5:
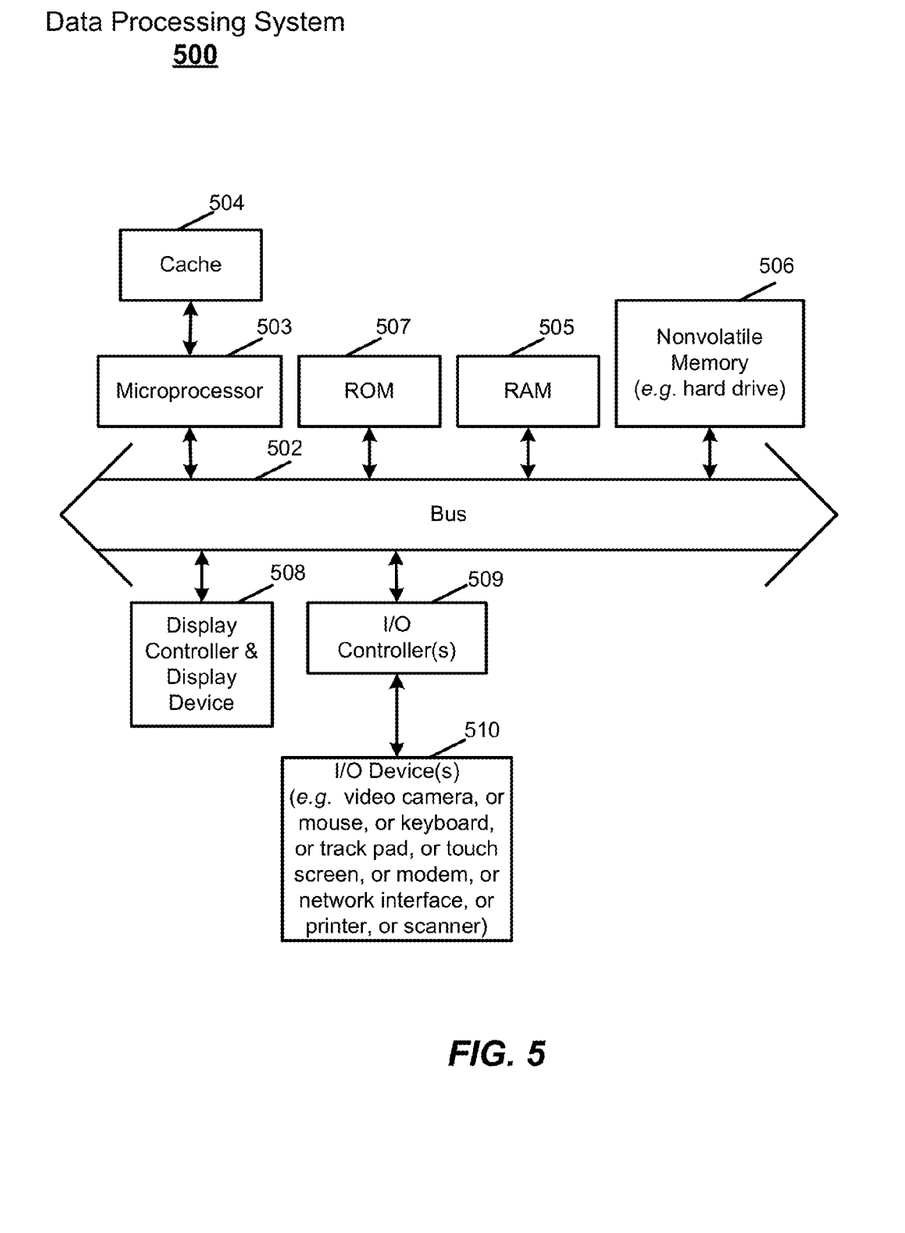
FIG. 5 depicts an example block diagram of a data processing system upon which the disclosed embodiments may be implemented.

First video source 210 and second video source 250 can include one of many types of mountable and wearable video cameras, including, without limitation, a helmet mounted video camera, a head worn video camera, a handheld video camera, a weapon mounted video camera, a personal video camera, or the like. For example, first video source 210 can be a head mounted night-vision goggle and second video source 250 can be a weapon mounted video source incorporated into a weapon sight. In certain embodiments, second video source 250 creates video 102 that is smaller than video 101 produced by first video source 210. For example, videos 101 and 102 can have the same respective, original resolutions, and a user, using user interface 258 can down-select video 102 to be a subset of video 101. According to an embodiment of the present invention, user interface 258 can comprise switches, buttons, or other user interface elements usable to down-select video 102. First video source 210 and second video source 250 can also include one of many types of computing devices having video capture and/or video processing capabilities, a personal computer, a laptop computer, a notebook computer, a tablet computer, a handheld mobile device, a PDA, a mobile phone, or the like. The first video source 210 includes a data processor 212, also referred to as a processor, and a memory 214. The description provided in relation to processors and memory in FIG. 5 is also applicable to the data processor 212 and memory 214. In the example provided in FIG. 2, data processor 212 can be embodied as an RTA digital processor. An input/output ("I/O") module 216 is provided to enable communication with the first video source 210 by external users and computing devices, such as, for example, the second video source 250. As shown in FIG. 2, I/O module 216 can be embodied as a receiver configured to receive a video signal and other data from the second video source 250 via the network 230.

The first video source 210 also includes a firmware switch 218. As used herein, the term "firmware" is used to refer to one or more operating instructions for controlling one or more hardware components of a device. Firmware can include software embedded on a hardware device. A firmware module or program can communicate directly with a hardware component, such as data processor 212 of the first video source 210, without interacting with the hardware component via an operating system of the hardware device. Firmware switch 218 can have executable instructions encoded thereon, that, if executed by data processor 212, cause data processor 212 to perform the operations described above with reference to the firmware switch 116 depicted in FIGS. 1 and 1E. In the embodiment depicted in FIG. 2, power supply 260 serves as a power source for first video source 210. Power supply 260 can be a wearable or mountable battery pack electrically connected to first video source 210. For example, in embodiments where first video source 210 is a helmet mounted video source, power supply 260 can be a helmet mounted battery pack that is external to first video source 210. In additional or alternative embodiments, data processor 212 can be integrated with power supply 260 such that data processor 212 and power supply 260 are both contained within a shared housing.

The first video source 210 is communicatively coupled, in one example, to an external display device 240. In an alternative embodiment, display device 240 is incorporated into first video source 210. The I/O module 216, data processor 212, memory 214, and firmware switch 218 are utilized to receive inputs from a user operating first video source 210, receive video from second video source 250, perform low latency fusion of video from first video source 210 and the video received from second video source 250, and render the fused video as output on display device 240.

Although an external display device 240 is illustrated in FIG. 2, this is not required by embodiments of the present invention. In some embodiments, fused video imagery is stored internally within memory 214 and displayed on a display device integrated with or mounted to first video source 210. One example of an integrated display device is the display 340 shown in FIG. 3, which is described below.

A user operating user second video source 250 interacts with the video fusion system 200 through network 230, which may be a wireless personal area network (PAN). In some embodiments, network 230 is partly or wholly a private wide area network (WAN), local area network (LAN), or the like. A user can control second video source 250 using user interface 258, which results in data transfer through I/O module 256 and network 230. The data can include a video stream, such as, for example, video 102 described above with reference to FIGS. 1 and 1B. With continued reference to FIGS. 1 and 2, first video source 210 can receive video 101, receive video 102 from the second video source 250, process the received video 102 using data processor 212, store the received and/or processed video 102 using memory 214, correlate and fuse video 102 with video 101 from first video source 210, and render the fused, display video 120 using display device 240. Second video source 250 can process video 102 using data processor 252, store video 102 using memory 254, and transmit the stored video 102 to first video source 210 via I/O module 256 and network 230. According to exemplary embodiments, a head worn or helmet mounted first video source 210 can receive video 102 from a handheld or weapon mounted second video source 250 through network 230 and I/O module 216, and then use data processor 212, memory 214, and firmware switch 218 to perform low latency fusion of video 102 with video 101 from first video source 210.

Figure 3:
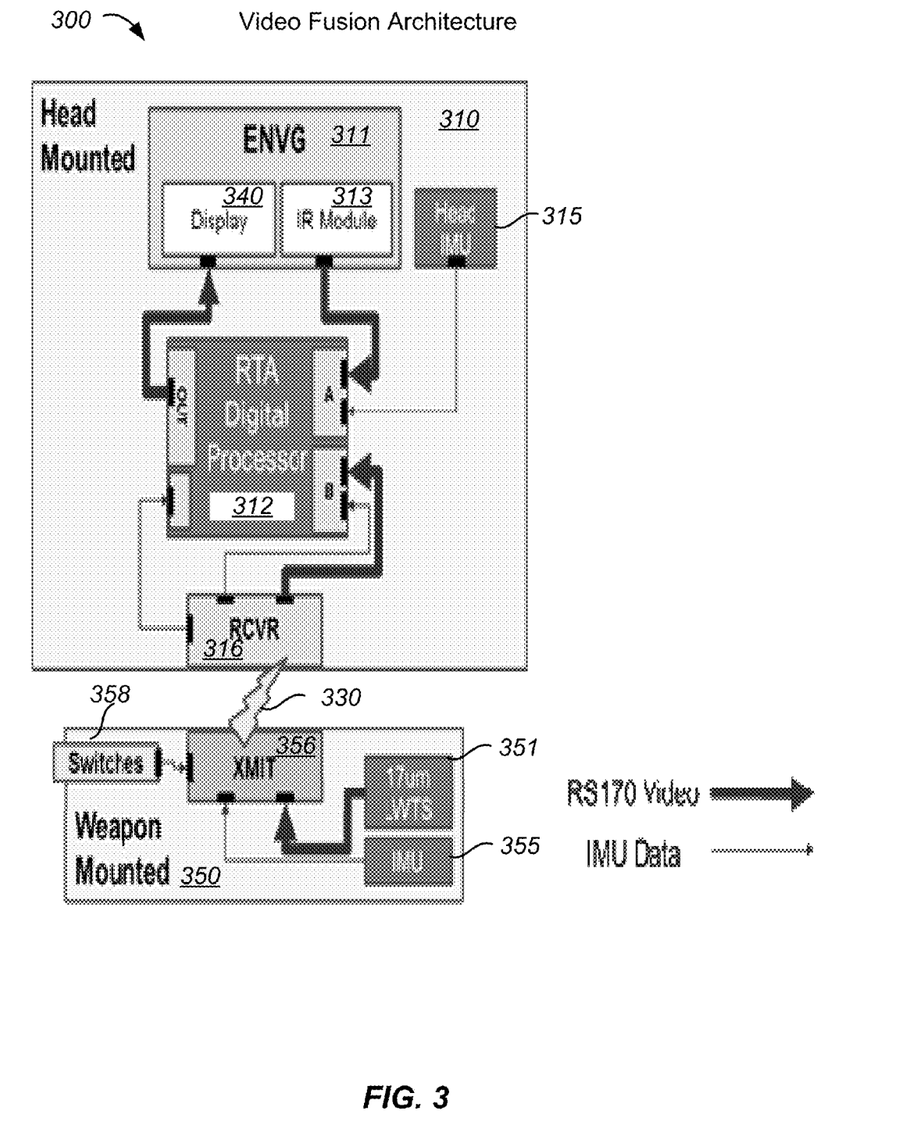
FIG. 3 is a schematic diagram illustrating a video fusion system architecture according to an embodiment of the present invention.

FIG. 3 is a schematic diagram illustrating a video fusion system architecture according to an embodiment of the present invention. In particular, FIG. 3 depicts components of a video fusion architecture 300 where a head mounted first video source 310 includes an enhanced night vision goggle (ENVG) 311, an RTA digital processor 312, a receiver 316, an integrated display 340, a head Inertial Measurement Unit (IMU) 315, and an infrared (IR) module 313. As shown, IR module 313 sends a video signal to RTA digital processor 312. In the embodiment depicted in FIG. 3, the video signal from IR module 313 is a first RS-170 video signal.

As illustrated in FIG. 3, architecture 300 further includes a weapon mounted second video source 350 including a light weapon thermal sight (LWTS) 351, switches 358, an weapon Inertial Measurement Unit (IMU) 355, and transmitter 356, which is configured to transmit data and video signals to receiver 316 via wireless network 330. In the non-limiting embodiment of FIG. 3, the LWTS 351 is a 17 μm LWTS. As shown, LWTS 351 sends a video signal to transmitter 356 and weapon IMU 355 sends IMU data to transmitter 356. Transmitter 356 is configured to transmit the IMU data and video signal from weapon mounted second video source 350 to the receiver 316 of the head mounted first video source 310. In the exemplary embodiment of FIG. 3, the video signals transmitted and received within architecture 300 are RS-170 video signals. As will be appreciated by one of ordinary skill in the art, RS-170 video signals contain both image and timing information.

According to an embodiment, as weapon mounted video source 350 moves, the movement is detected by weapon IMU 355. As the weapon that weapon mounted video source 350 is mounted to moves, the imagery in video signal from LWTS 351 will move relative to the imagery in the video signal from the IR module 313 of the ENVG 311. For example, such movement can occur when a user is pointing the weapon. For instance, with reference to FIG. 1, if area 112 includes an object in the left portion of video 101, and the user wants to target another object to the right of the object, the user can move the weapon to the right. In response to this movement, area 112 moves, but the rest of video 101 may not move to the same degree. This is because head mounted video source 310 and weapon mounted video source 350 can move independently of each other. For example, the user move the weapon as discussed above, and the user can simultaneously move head mounted video source 310. For example, when the user looks up, down, to the left, and/or to the right, head mounted video source 310 will move accordingly. In these cases, the image corresponding to video 101 in the background moves as the user's head moves. By performing the low latency video fusion techniques described herein, architecture 300 ensures that the background image has negligible latency relative to area 112 so that the user does not experience dizziness or fatigue associated with associated with viewing video imagery having high latency between the background and an inserted video image.

Figure 4:
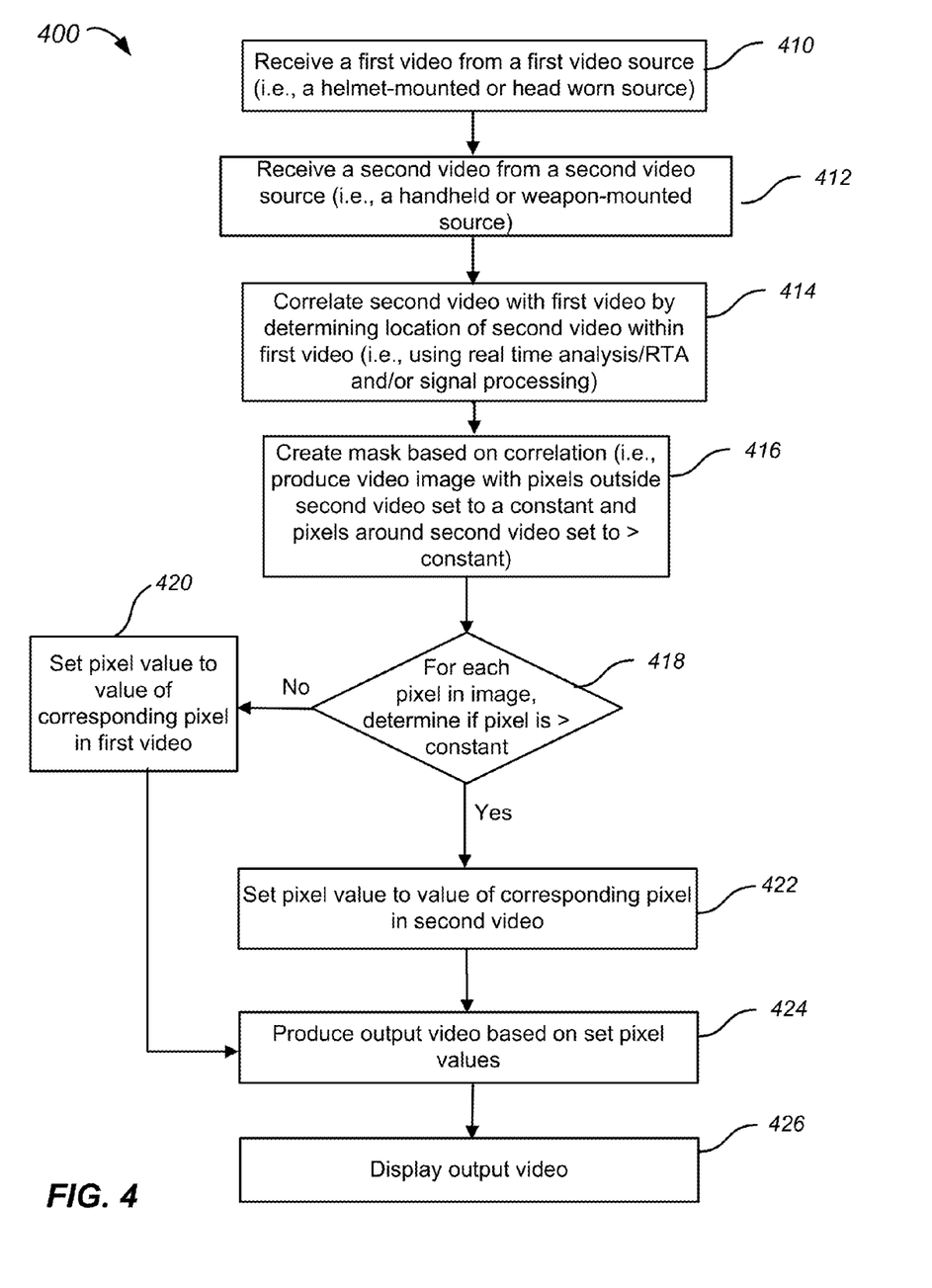
FIG. 4 is a simplified flowchart illustrating a method of low latency video fusion according to an embodiment of the present invention.

FIG. 4 depicts an example flow chart of a method for low latency video fusion, according to embodiments. In particular, FIG. 4 illustrates steps of a method 400 for ultra low video fusion using multiple video signals received from respective video sources.

Method 400 begins at step 410 where a first video is received. The video received in this step can be provided by a first video source. In the example of FIG. 4, first video source can be a helmet-mounted or head worn video source. The first video received in this step can be first video 101 shown in FIG. 1. Method 400 then proceeds to step 412 where a second video is received. As shown, the second video received in this step can be a video signal provided by a second video source. In an embodiment, step 412 can comprise receiving the second video signal from a handheld or weapon-mounted video source. After the second video is received, control is passed to step 414.

In step 414, the second video is correlated with first video. As shown, this step can comprise determining the location of the second video within the first video by performing signal processing. After the correlation is complete, control is passed to step 416, where a mask is created. The mask is created based on the correlation. As shown, step 416 can comprise producing a video image with pixels around the second video being set to be greater than a constant value and pixels outside the second video being set to zero. In an embodiment, step 416 can comprise using a predetermined, tunable value as the constant value. In another embodiment, step 416 can comprise performing the RTA processing described above with reference to FIG. 1. After the mask is created, method 400 continues with step 418.

Next, in step 418, a determination is made as to whether a pixel in the video image created in step 416 is greater than the constant value or not. As shown, step 418 is iterated for each pixel in the video image. If it is determined that the pixel has a value greater than the constant, control is passed to step 422. Otherwise, the pixel has a value less than or equal to the constant and control is passed to step 420. In cases where the constant value is zero, steps 418-422 can comprise performing the instructions 118 depicted in FIGS. 1 and 1E.

In step 420, the pixel value for an pixel of a display video is set to the value of the corresponding pixel in the first video. For example, if a pixel at location x,y of the video image produced in step 416 was determined to have a non-zero value in step 418, then step 420 will use the pixel at location x,y in the first video as part of display video. After the pixel value is set, control is passed to step 424.

In step 422, the pixel value for an pixel of a display video is set to the value of the corresponding pixel in the correlated video. For instance, if a pixel at location x,y of the video image produced in step 416 was determined to have a value of zero in step 418, then step 422 will use the pixel at location x,y in the correlated video as part of display video. After the pixel value is set, control is passed to step 424 where the display video is produced. In step 424, the display video is generated based on the pixel values set as a result of executing steps 418-322. After the display video is generated, control is passed to step 426.

In step 426, the display video is rendered. With reference to FIGS. 1-3, in an embodiment, step 426 comprises rendering display video 120 on display device 240. This completes method 400 according to one example embodiment. In additional or alternative embodiments, additional steps can be performed. For example, method 400 can be expanded to include further steps for fusing video signals from different sources other than the exemplary sources shown in steps 410 and 412.

It should be appreciated that the specific steps illustrated in FIG. 4 provide a particular method of designing internal structures for controlling stray light reflections within an optical system according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Provided below are descriptions of some devices (and components of those devices) that may be used in the systems and methods described above. These devices may be used, for instance, to receive, transmit, process, and/or store data related to any of the functionality described above. As will be appreciated by one of ordinary skill in the art, the devices described below may have only some of the components described below, or may have additional components.

FIG. 5 depicts an example block diagram of a data processing system upon which the disclosed embodiments may be implemented. Embodiments of the present invention may be practiced with various computer system configurations such as hand-held devices, microprocessor systems, microprocessor-based or programmable user electronics, minicomputers, mainframe computers and the like. For example, steps of the method 400 described above with reference to FIG. 4 can be carried out by the data processing system 500 shown in FIG. 5. The embodiments can also be practiced in distributed computing environments where tasks are performed by remote processing devices that are linked through a wire-based or wireless network. FIG. 5 shows one example of a data processing system, such as data processing system 500, which may be used with the present described embodiments. Note that while FIG. 5 illustrates various components of a data processing system, it is not intended to represent any particular architecture or manner of interconnecting the components as such details are not germane to the techniques described herein. It will also be appreciated that network computers and other data processing systems which have fewer components or perhaps more components may also be used. The data processing system of FIG. 5 may, for example, be a personal computer (PC), workstation, tablet, smartphone or other hand-held wireless device, or any device having similar functionality. The data processing system of FIG. 5, may also, for example, be incorporated into or communicatively coupled with video sources 210 and 250 illustrated in FIG. 2, discussed above.

As shown, the data processing system 500 includes a system bus 502 which is coupled to a microprocessor 503, a Read-Only Memory (ROM) 507, a volatile Random Access Memory (RAM) 505, as well as other nonvolatile memory 506. In the illustrated embodiment, microprocessor 503 is coupled to cache memory 504. System bus 502 can be adapted to interconnect these various components together and also interconnect components 503, 507, 505, and 506 to a display controller and display device 508, and to peripheral devices such as input/output ("I/O") devices 510. In certain embodiments, one or more of the displays 240 and 340 described above with reference to FIGS. 2 and 3 can be embodied as display controller and display device 508 shown in FIG. 5. Types of I/O devices can include video cameras, keyboards, modems, network interfaces, printers, scanners, or other devices well known in the art. Typically, I/O devices 510 are coupled to the system bus 502 through I/O controllers 509. In one embodiment, the I/O controller 509 includes a Universal Serial Bus ("USB") adapter for controlling USB peripherals or other type of bus adapter. In certain embodiments, one or more of the data processors 212 and 252 described above with reference to the video sources 210 and 250 of FIG. 2 can be embodied as the microprocessor 503 shown in FIG. 5. In another embodiment, the RTA digital processor 312 discussed above with reference to the head mounted video source 310 of FIG. 3 can be embodied as microprocessor 503.

RAM 505 can be implemented as dynamic RAM ("DRAM") which requires power continually in order to refresh or maintain the data in the memory. The other nonvolatile memory 506 can be a magnetic hard drive, magnetic optical drive, optical drive, DVD RAM, or other type of memory system that maintains data after power is removed from the system. While FIG. 5 shows that nonvolatile memory 506 as a local device coupled with the rest of the components in the data processing system, it will be appreciated by skilled artisans that the described techniques may use a nonvolatile memory remote from the system, such as a network storage device coupled with the data processing system through a network interface such as a modem or Ethernet interface (not shown). In certain embodiments, one or more of the memories 214 and 254 described above with reference to FIG. 2 can be embodied as RAM 505 shown in FIG. 5.

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a data processing system. That is, the techniques may be carried out in a computer or other data processing system in response executing sequences of instructions stored in memory. In particular, the instructions, when executed, enable microprocessor 503 to implement the processes of the present invention, such as the steps in the method 400 illustrated by the flowchart of FIG. 4, discussed above. In various embodiments, hardwired circuitry may be used independently, or in combination with software instructions, to implement these techniques. For instance, the described functionality may be performed by specific hardware components containing hardwired logic for performing operations, or by any combination of custom hardware components and programmed computer components. The techniques described herein are not limited to any specific combination of hardware circuitry and software.

Embodiments herein may also be in the form of computer code stored on a computer-readable medium. Computer-readable media can also be adapted to store computer instructions, which when executed by a computer or other data processing system, such as data processing system 500, are adapted to cause the system to perform operations according to the techniques described herein. Computer-readable media can include any mechanism that stores information in a form accessible by a data processing device such as a computer, network device, tablet, smartphone, or any device having similar functionality. Examples of computer-readable media include any type of tangible article of manufacture capable of storing information thereon such as a hard drive, floppy disk, DVD, CD-ROM, magnetic-optical disk, ROM, RAM, EPROM, EEPROM, flash memory and equivalents thereto, a magnetic or optical card, or any type of media suitable for storing electronic data. Computer-readable media can also be distributed over a network-coupled computer system, which can be stored or executed in a distributed fashion.

Throughout the foregoing description, for the purposes of explanation, numerous specific details were set forth in order to provide a thorough understanding of the invention. It will be apparent, however, to persons skilled in the art that these embodiments may be practiced without some of these specific details. Accordingly, the scope and spirit of the invention should be judged in terms of the claims which follow as well as the legal equivalents thereof.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of processing video, the method comprising:
   receiving a first video signal from a first video source;
   receiving a second video signal from a second video source;
   generating a mask as a function of the second video signal by identifying where a center point of the second video signal should be located in the first video signal, wherein the mask has a mask area and a peripheral area;
   displaying the first video signal in the peripheral area;
   processing the second video signal in the mask area; and
   displaying the processed second video signal in the mask area.

2. The method of claim 1 wherein the first video source comprises a head worn video camera configured to be mounted to a helmet.

3. The method of claim 1 wherein the second video source comprises a handheld video camera.

4. The method of claim 1 wherein the second video source comprises a weapon mounted video camera.

5. The method of claim 1 wherein the mask area is defined by a radius from the center point of the second video signal.

6. The method of claim 5 wherein the radius is a tunable parameter expressed in terms of pixels.

7. The method of claim 1 wherein generating the mask comprises setting pixel values outside the mask area to be equal to a predetermined constant.

8. The method of claim 7 wherein the predetermined constant is a tunable value with a default value of zero.

9. The method of claim 1 wherein displaying the first video signal in the peripheral area and displaying the processed second video signal in the mask area are displayed on a single display.

10. The method of claim 1 wherein processing the second video signal in the mask area comprises performing real time analysis of:
    the first video signal in the mask area; and
    the second video signal in the mask area.

11. The method of claim 1 wherein a pixel count of the first video signal is greater than a pixel count of the second video signal.

12. A system for processing video, the system comprising:
    a display device;
    a processor; and
    a memory having instructions stored thereon, that, when executed by the processor, cause to processor to perform operations, the operations comprising:
      receiving a first video signal from a first video source;
      receiving a second video signal from a second video source;
      generating a mask as a function of the second video signal by identifying where a center point of the second video signal should be located in the first video signal, wherein the mask has a mask area and a peripheral area;
      displaying, on the display device, the first video signal in the peripheral area;
      processing the second video signal in the mask area; and
      displaying, on the display device, the processed second video signal in the mask area.

13. The system of claim 12, wherein the first video source comprises a helmet mounted video camera.

14. The system of claim 12 wherein the processing reduces latency between the second video signal and the first video signal.

15. The system of claim 13 wherein the second video source comprises a handheld video camera.

16. The system of claim 15 wherein the handheld video camera is configured to be mounted on one or more of a weapon or a sporting equipment device or a portion of a wearer of the helmet.

17. The system of claim 12 wherein generating the mask comprises:
    setting pixel values outside the mask area to be equal to zero.

18. The system of claim 12 wherein displaying the first video signal in the peripheral area and displaying the processed second video signal in the mask area are displayed on a single display of the display device.

19. The system of claim 12 wherein processing the second video signal in the mask area comprises performing real time analysis of:
    the first video signal in the mask area; and
    the second video signal in the mask area.

20. A non-transitory computer readable storage medium having instructions stored thereon, that, if executed by a computing device, cause the computing device to perform operations, the operations comprising:
    receiving a first video signal from a first video source;
    receiving a second video signal from a second video source;
    generating a mask as a function of the second video signal by identifying where a center of the second video signal should be located in the first video signal, wherein the mask has a mask area and a peripheral area;
    displaying the first video signal in the peripheral area;

processing the second video signal in the mask area; and
displaying the processed second video signal in the mask area.

* * * * *